United States Patent
Han et al.

(10) Patent No.: US 11,153,544 B2
(45) Date of Patent: Oct. 19, 2021

(54) METHOD AND APPARATUS FOR CORRECTING COLOR CONVERGENCE ERROR, AND DEVICE

(71) Applicant: GOERTEK INC., Shandong (CN)

(72) Inventors: Xinxin Han, Weifang (CN); Zhiyong Zhao, Weifang (CN); Nanjing Dong, Weifang (CN); Debo Sun, Weifang (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 17/058,619

(22) PCT Filed: Sep. 6, 2018

(86) PCT No.: PCT/CN2018/104395
§ 371 (c)(1),
(2) Date: Nov. 24, 2020

(87) PCT Pub. No.: WO2019/227760
PCT Pub. Date: Dec. 5, 2019

(65) Prior Publication Data
US 2021/0211625 A1    Jul. 8, 2021

(30) Foreign Application Priority Data
May 31, 2018   (CN) .......................... 201810556341.5

(51) Int. Cl.
*H04N 9/31* (2006.01)
*H04N 9/73* (2006.01)

(52) U.S. Cl.
CPC ......... *H04N 9/3194* (2013.01); *H04N 9/3182* (2013.01); *H04N 9/735* (2013.01)

(58) Field of Classification Search
CPC ..... H04N 9/3194; H04N 9/3182; H04N 9/735
See application file for complete search history.

(56) References Cited

U.S. PATENT DOCUMENTS 5,245,262 A * 9/1993 Moody .............. G05B 19/4142
318/560
6,058,221 A * 5/2000 Bukal .................... H04N 17/04
382/286
(Continued)

FOREIGN PATENT DOCUMENTS

CN            1992912 A      7/2007
CN          101022564 A      8/2007
(Continued)

OTHER PUBLICATIONS

Chinese office action dated Sep. 29, 2019 as received in application No. 201810556341.5.
(Continued)

*Primary Examiner* — Brian P Yenke
(74) *Attorney, Agent, or Firm* — Maschoff Brennan

(57) ABSTRACT

Provided are a method and an apparatus for correcting a color convergence error, and a device. The method includes: controlling a projection system to project a first test pattern containing three sets of monochromatic test points and a second test pattern containing three sets of R, G, and B test points, to collect a first projection image and a second projection image on the projection screen; acquiring a first center-of-mass coordinate and a second center-of-mass coordinate corresponding to projection image points on the first projection image and the second projection image; calculating color noises corresponding to R, G, and B according to the first center-of-mass coordinate and the second center-of-mass coordinate; calculating color coordinates corresponding to the R, G, and B according to the color noises corresponding to the R, G, and B and the second center-of-mass coordinate; and adjusting an assembly parameter of the projection system.

19 Claims, 6 Drawing Sheets

(56) References Cited

U.S. PATENT DOCUMENTS

| | | | |
|---|---|---|---|
| 6,292,171 B1* | 9/2001 | Fu | G09G 3/002 345/156 |
| 6,995,810 B2* | 2/2006 | Melton | G02B 7/08 348/177 |
| 9,716,870 B2* | 7/2017 | Sano | H04N 9/3194 |
| 9,762,869 B2* | 9/2017 | Nakashin | H04N 9/3185 |
| 9,794,450 B2* | 10/2017 | Kobiki | H04N 9/3194 |
| 10,057,556 B2* | 8/2018 | Grundhofer | H04N 9/3182 |
| 10,326,968 B2* | 6/2019 | Iversen | H04N 13/327 |
| 10,681,318 B2* | 6/2020 | De La Cruz | H04N 9/3194 |
| 10,992,913 B2* | 4/2021 | Uemura | G06T 3/00 |
| 2007/0154086 A1 | 7/2007 | Cho | |
| 2015/0103157 A1 | 4/2015 | Hsu | |
| 2015/0271461 A1* | 9/2015 | Hayashi | H04N 9/04555 348/223.1 |
| 2016/0165200 A1* | 6/2016 | Helt | H04N 9/3182 348/182 |
| 2017/0243342 A1* | 8/2017 | Iwami | H04N 9/083 |
| 2018/0220115 A1* | 8/2018 | Kitagawa | H04N 9/3105 |
| 2019/0141302 A1* | 5/2019 | Fukui | H04N 9/3182 |
| 2020/0241509 A1* | 7/2020 | Dong | G02B 7/023 |
| 2020/0271441 A1* | 8/2020 | Dong | G02B 7/02 |
| 2020/0292837 A1* | 9/2020 | Dong | G02B 7/003 |
| 2020/0331105 A1* | 10/2020 | Dong | B25J 15/0061 |
| 2021/0211620 A1* | 7/2021 | Han | H04N 9/3191 |
| 2021/0235047 A1* | 7/2021 | Han | H04N 9/3185 |

FOREIGN PATENT DOCUMENTS

| | | |
|---|---|---|
| CN | 102547306 A | 7/2012 |
| CN | 102611822 A | 7/2012 |

OTHER PUBLICATIONS

Chinese office action dated Mar. 25, 2020 as received in application No. 201810556341.5.

* cited by examiner

METHOD AND APPARATUS FOR CORRECTING COLOR CONVERGENCE ERROR, AND DEVICE

TECHNICAL FIELD

The present disclosure relates to the field of assembling technology, and in particular a method and an apparatus for correcting a color convergence error, and a device.

BACKGROUND

In order to solve the defect of insufficient color gamut space in traditional display technologies, display technologies based on red (R), green (G), and blue (B) light sources have emerged, such as three-chip reflective/projection display technology, laser scanning display technology and laser projection display technology, etc. These display technologies based on RGB three-color light source can truly reproduce the rich and gorgeous colors of the objective world and provide more shocking color expression.

The display technologies based on RGB three-color light sources usually include three light sources, and each light source corresponds to one of the three primary colors. A variety of colored lights can be obtained after the lights emitted by the three light sources are mixed in different proportions.

However, due to the mechanical error of the system assembly and the chromatic aberration of the optical component, in the image displayed by the display technology based on the RGB three-color light source, there may be overlapping error in the red, green, and blue pixels, which will affect the clarity of the image. In view of this, a method for correcting the color convergence error needs to be proposed urgently.

SUMMARY

Various aspects of the present disclosure provide a method and an apparatus for correcting a color convergence error, and a device, which are used to detect and correct the color convergence error of a projection system, to improve the imaging quality of the projection optical module.

The present disclosure provides a method for correcting a color convergence error, including: controlling a projection system to project a first test pattern containing three sets of monochromatic test points and a second test pattern containing three sets of R, G, and B test points, to collect respectively a first projection image and a second projection image on the projection screen; where centers of three geometric figures by taking respectively the three sets of monochromatic test points as vertices superpose, and positions of the three sets of R, G, and B test points have a one-to-one correspondence with positions of the three sets of monochromatic test points; acquiring respectively a first center-of-mass coordinate and a second center-of-mass coordinate corresponding to projection image points on the first projection image and the second projection image; calculating respectively color noises corresponding to R, G, and B according to the first center-of-mass coordinate and the second center-of-mass coordinate; calculating color coordinates corresponding to the R, G, and B according to the color noises corresponding to the R, G, and B and the second center-of-mass coordinate; and adjusting an assembly parameter of the projection system according to the color coordinates corresponding to the R, G, and B.

Further optionally, the calculating respectively the color noises corresponding to the R, G, and B according to the first center-of-mass coordinate and the second center-of-mass coordinate includes: calculating respectively coordinate offsets of the projection image points corresponding to the three sets of R, G, and B test points relative to the projection image points corresponding to the three sets of monochrome test points according to the first center-of-mass coordinate and the second center-of-mass coordinate; and determining the color noises corresponding to the R, G, and B according to the coordinate offsets.

Further optionally, the calculating respectively the coordinate offsets of the projection image points corresponding to the three sets of R, G, and B test points relative to the projection image points corresponding to the three sets of monochrome test points according to the first center-of-mass coordinate and the second center-of-mass coordinate comprises: for the i-th set of test points in the three sets of R, G, and B test points, determining coordinates of the projection image points corresponding to the i-th set of test points according to the second center-of-mass coordinate, i=1, 2, or 3; determining coordinates of the projection image points corresponding to the i'-th set of test points on having the same position as the i-th set of test points on the first test pattern according to the first center-of-mass coordinate, i'=i; and calculating coordinate differences between the projection image points corresponding to the i-th set of test points and the projection image points corresponding to the i'-th set of test points according to the coordinates of the projection image points corresponding to the i-th set of test points and the coordinates of the projection image points corresponding to the i'-th set of test points, and taking the coordinate differences as the coordinate offsets.

Further optionally, the calculating the color coordinates corresponding to the R, G, and B according to the color noises corresponding to the R, G, and B and the second center-of-mass coordinate includes: calculating center coordinates of three geometric figures by taking respectively the projection image points corresponding to the three sets of R, G, and B test points as vertices according to the second center-of-mass coordinate; and correcting center coordinates of three geometric figures by taking respectively the projection image points corresponding to the three sets of R, G, and B test points as vertices according to the color noises, to obtain the color coordinates of the projection image points corresponding to the three sets of R, G, and B test points.

Further optionally, the adjusting the assembly parameter of the projection system according to the color coordinates corresponding to the R, G, and B includes: calculating a superposition deviation of three colors of R, G, and B according to the color coordinates of the projection image points corresponding to the three colors of R, G, and B; if the superposition deviation is greater than a set deviation threshold, adjusting a position of a light source of the three colors of R, G, and B in the projection system, to reduce the superposition deviation.

Further optionally, any two test points in the three sets of monochromatic test points are not in the same row and not in the same column.

Further optionally, each of the three sets of monochromatic test points includes four test points.

The present disclosure further provides an apparatus for correcting a color convergence error, including: a projecting module, configured to control a projection system to project a first test pattern containing three sets of monochromatic test points and a second test pattern containing three sets of R, G, and B test points, to collect respectively a first projection image and a second projection image on the projection screen; where centers of three geometric figures by taking respectively the three sets of monochromatic test points as vertices superpose, and positions of the three sets of R, G, and B test points have a one-to-one correspondence with positions of the three sets of monochromatic test points; a coordinate calculating module, configured to acquire respectively a first center-of-mass coordinate and a second center-of-mass coordinate corresponding to projection image points on the first projection image and the second projection image; a noise calculating module, configured to calculate respectively color noises corresponding to R, G, and B according to the first center-of-mass coordinate and the second center-of-mass coordinate; a coordinate correcting module, configured to calculate color coordinates corresponding to the R, G, and B according to the color noises corresponding to the R, G, and B and the second center-of-mass coordinate; and an error correcting module, configured to adjust an assembly parameter of the projection system according to the color coordinates corresponding to the R, G, and B.

Further optionally, the noise calculating module is specifically configured to: calculate respectively coordinate offsets of the projection image points corresponding to the three sets of R, G, and B test points relative to the projection image points corresponding to the three sets of monochrome test points according to the first center-of-mass coordinate and the second center-of-mass coordinate; and determine the color noises corresponding to the R, G, and B according to the coordinate offsets.

The present disclosure further provides an electronic device, including: a memory and a processor; where the memory is used to store at least one computer instruction; and the processor is used to execute the at least one computer instruction for executing the method for correcting the color convergence error provided by the present disclosure.

In the present disclosure, the projection system is controlled to project the first test pattern and the second test pattern, and whether the three different color light points projected by the projection system being superposed are analyzed by comparing the projection results corresponding to the first test pattern and the second test pattern whether the points coincide to determine whether there is a color convergence error in the projection system. In such a technical solution, the color convergence error of the projection system may be effectively detected and corrected, which is beneficial to improve the imaging quality of the projection system.

BRIEF DESCRIPTION OF THE DRAWINGS

In order to more clearly explain the embodiments of the present disclosure or the technical solutions in the prior art, the drawings used in the description of the embodiments or the prior art will be briefly introduced below. Obviously, the drawings in the following description are some embodiments of the present disclosure. For those of ordinary skill in the art, other drawings can be obtained based on these drawings without paying creative labor.

DETAILED DESCRIPTION OF EXAMPLE EMBODIMENTS

For making the purposes, technical solutions and advantages of the embodiments of the present disclosure clearer, the technical solutions in the embodiments of the present disclosure will be clearly and completely described below in combination with the drawings in the embodiments of the present disclosure. It is apparent that the described embodiments are not all embodiments but part of embodiments of the present disclosure. All other embodiments obtained by those of ordinary skill in the art on the basis of the embodiments in the present disclosure without creative work shall fall within the scope of protection of the present disclosure.

Figure 1:
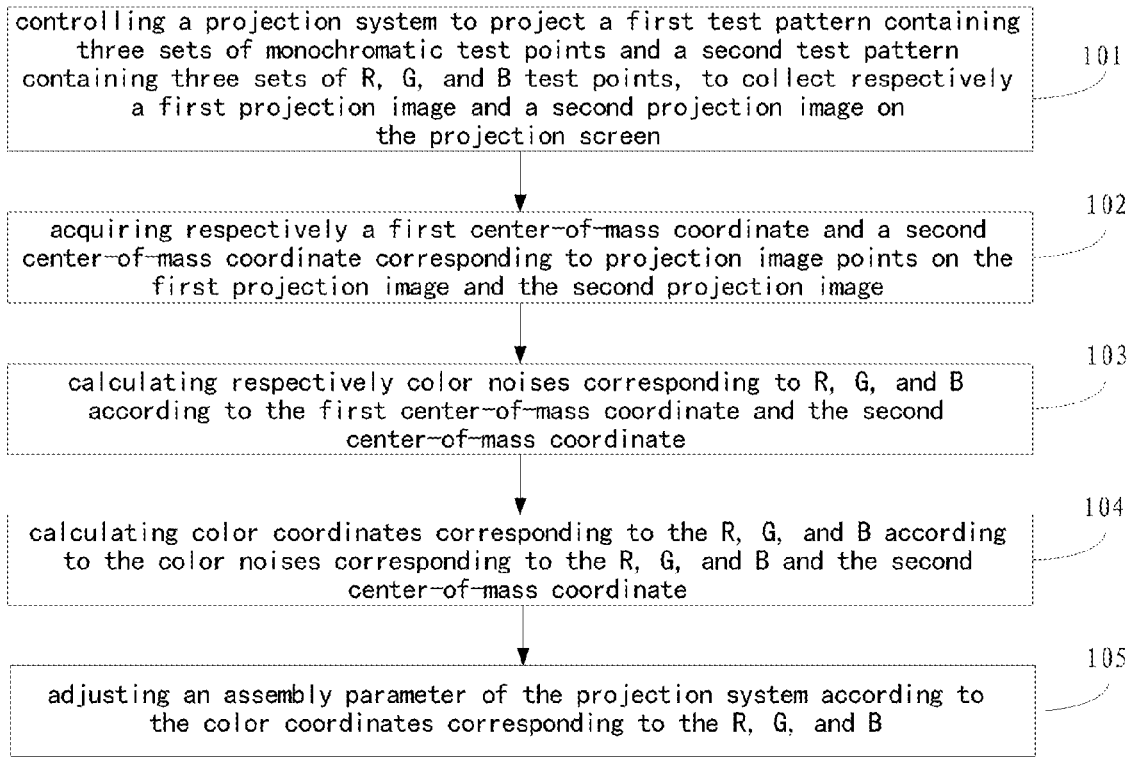
FIG. 1 is a flowchart of a method for correcting a color convergence error according to an embodiment of the present disclosure.

FIG. 1 is a flowchart of a method for correcting a color convergence error according to an embodiment of the present disclosure. As shown in FIG. 1, the method includes:

step 101: controlling a projection system to project a first test pattern containing three sets of monochromatic test points and a second test pattern containing three sets of R, G, and B test points, to collect respectively a first projection image and a second projection image on the projection screen;

step 102: acquiring respectively a first center-of-mass coordinate and a second center-of-mass coordinate corresponding to projection image points on the first projection image and the second projection image;

step 103: calculating respectively color noises corresponding to R, G, and B according to the first center-of-mass coordinate and the second center-of-mass coordinate;

step 104: calculating color coordinates corresponding to the R, G, and B according to the color noises corresponding to the R, G, and B and the second center-of-mass coordinate; and step 105: adjusting an assembly parameter of the projection system according to the color coordinates corresponding to the R, G, and B.

In this embodiment, the first test pattern includes three sets of monochromatic test points, and the centers of three geometric figures by taking the three sets of monochromatic test points as the vertices superpose. The monochrome may be any one of R (red), G (green), and B (blue). R, G, and B are the three primary colors of light, and a full-color image may be obtained by the projection of the projection system based on the combination of the three primary colors.

The second test pattern includes three sets of R, G, and B test points, and the positions of the three sets of R, G, and B test points have a one-to-one correspondence with positions of the three sets of monochromatic test points. In other words, the colors of the test points on the second test pattern and the test points on the first test pattern are different, but the arrangement and the number of test points are the same. The centers of three geometric figures by taking respectively the three sets of R, G, and B test points as vertices superpose. Specifically, it is assumed that a first geometric figure may be drawn by taking the set of R test points as the vertices, a second geometric figure may be drawn by taking the set of G test points as the vertices, a third geometric figure may be drawn by taking the set of B test points as the vertices, and the centers of the first geometric figure, the second geometric figure, and the third geometric figure superpose.

Optionally, the method for detecting the color convergence error according to the present disclosure can be applied to a variety of display systems based on RGB three-color light source imaging, such as a three-chip reflection/projection system based on RGB three-color light source, and a laser scanning display system based on RGB three-color light source, etc. The technical solution of the present disclosure will be illustrated by taking a three-chip reflection projection system as an example below.

The display component of the three-chip reflection projection system includes three display screens: a first display screen, a second display screen, and a third display screen. During projection, different colors of light can be used to illuminate the three display screens in the projection system. After the three display screens are illuminated by the corresponding color of light, they reflect different color of light. The photosynthetic light of different colors is emitted from the projection lens, and the test pattern is projected onto the projection screen. Ideally, that is, there is no color convergence error in the projection system, the pixel positions of the three different colors of red, green, and blue projected by the three display screens accurately superpose. Therefore, in the next step, it can be determined whether the projection system has a color convergence error based on the position feature of the projection image points in the projection image.

The first projection image is obtained by the projection of the projection system with regard to the first test pattern, which contains projection image points corresponding to the three sets of the monochrome test points. After the first projection image is acquired, the center-of-mass coordinates of the projection image points corresponding to the three sets of monochrome test points can be calculated as the first center-of-mass coordinate.

The second projection image is obtained by the projection of the projection system with regard to the second test pattern, which contains projection image points corresponding to three sets of R, G, and B test points. After the second projection image is acquired, the center-of-mass coordinates of the projection image points corresponding to the three sets of R, G, and B test points can be calculated as the second center-of-mass coordinate. It should be understood that the first center-of-mass coordinate/the second center-of-mass coordinate is a general term for the center-of-mass coordinate calculated according to the first projection image/the second projection image, and the first center-of-mass coordinate/the second center-of-mass coordinate may include multiple center-of-mass coordinate.

After the first center-of-mass coordinate and the second center-of-mass coordinate are determined, the color noises corresponding to R, G, and B are calculated respectively. Color noise can be considered as the image noise introduced in the three color channels of R, G, and B during the projection process, affected by the projection environment, projection hardware, or exposure time when shooting the projection image.

Then, the color coordinates corresponding to R, G, and B can be calculated based on the calculated color noises corresponding to R, G, and B and the second center-of-mass coordinate. The color coordinates refer to: the coordinates of the three color components R, G, and B contained in the image-side pixels obtained after the object-side pixels being projected by the projection system. It should be understood that when there is a color convergence error in the projection system, there is positional deviation in the coordinates of the three color components of R, G, and B contained in an image-side pixel have; on the contrary, when there is no color convergence error in the projection system, the three color components R, G, and B contained in the image point superpose.

The second test pattern contains three sets of R, G, and B test points, and the second projection image obtained by projection contains pixel component information of the three color channels of R, G, and B. Furthermore, the color coordinates corresponding to R, G, and B can be calculated according to the second center-of-mass coordinate, and corresponding color coordinate is corrected by using the color noises corresponding to R, G, and B, to obtain more accurate color coordinate values.

After the color coordinates corresponding to R, G, and B are determined, it can be determined whether the superposition degree of the three color pixels of R, G, and B meets a requirement, and the assembly parameter of the projection system can be adjusted when the requirement is not met.

In this embodiment, the projection system is controlled to project the first test pattern and the second test pattern, and whether the three different color light points projected by the projection system being superposed are analyzed by comparing the projection results corresponding to the first test pattern and the second test pattern whether the points coincide to determine whether there is a color convergence error in the projection system. In such a technical solution, the color convergence error of the projection system may be effectively detected and corrected, which is beneficial to improve the imaging quality of the projection system.

Figure 2A:
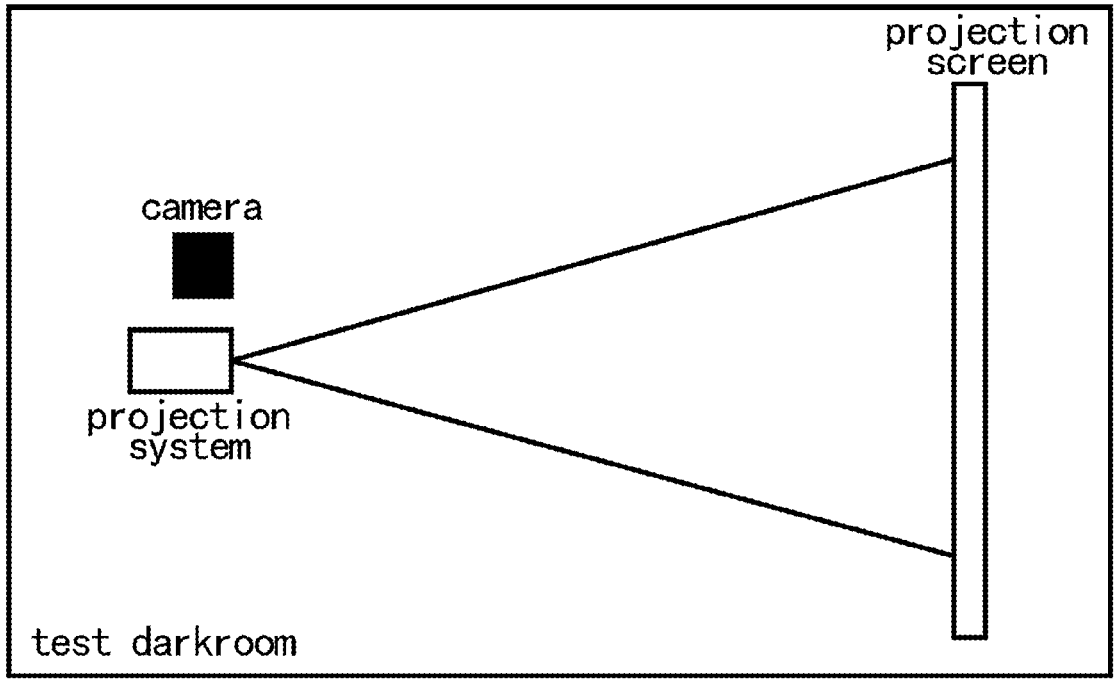
FIG. 2a is a schematic diagram of projecting and shooting a projection image in a darkroom environment according to an embodiment of the present disclosure.

Optionally, this embodiment can be executed in a test darkroom environment as shown in FIG. 2a. In the darkroom environment, the projection system is controlled to project on the projection screen and the camera is controlled to collect the projection image, to ensure that the projection system is not interfered by ambient stray light when imaging, and try to avoid the introduction of image noise, which is beneficial to improve the reliability of color convergence error detection and the accuracy of color convergence error correction.

Figure 2B:
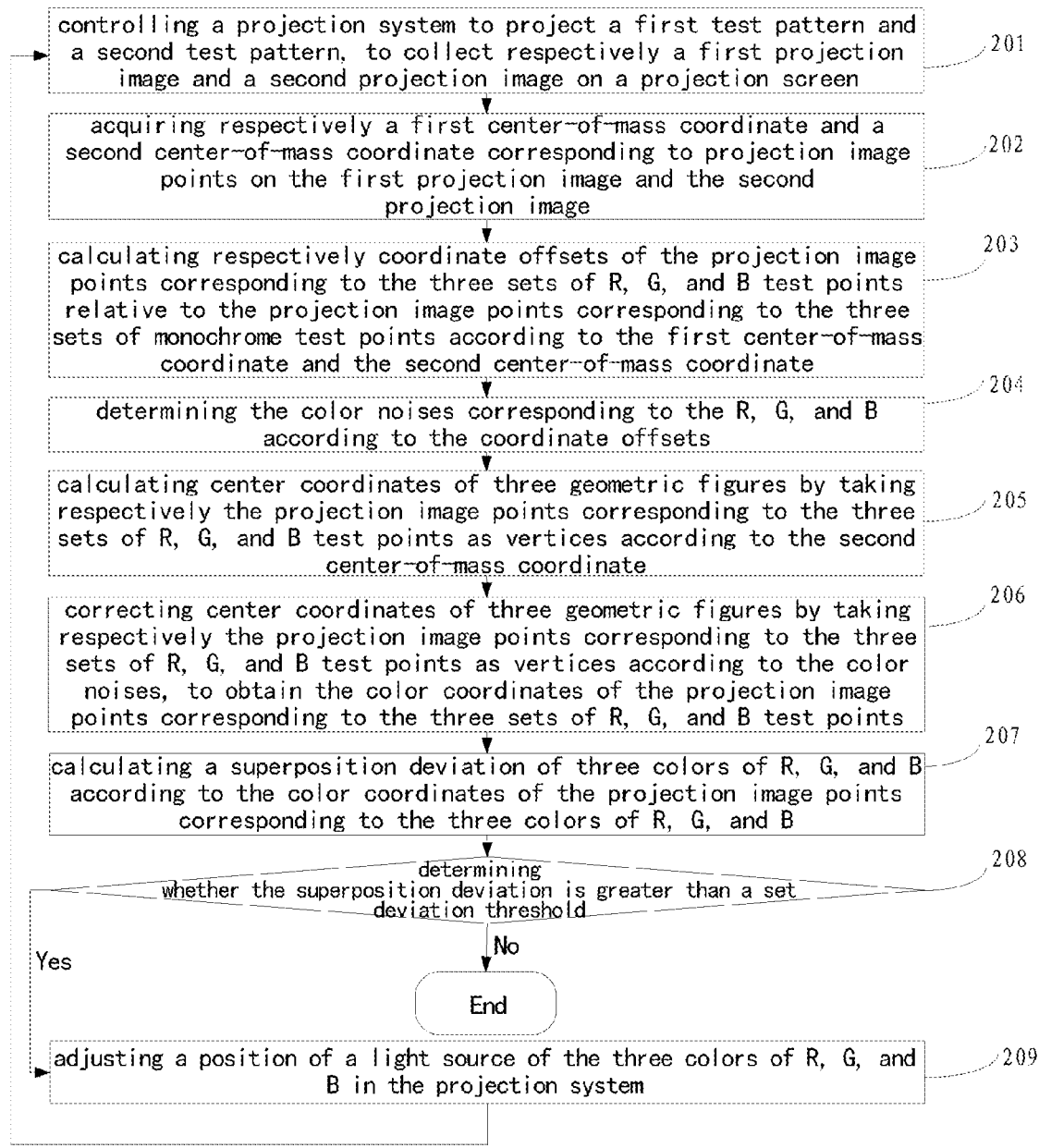
FIG. 2b is a flowchart of a method for correcting a color convergence error according to another embodiment of the present disclosure.

FIG. 2b is a flowchart of a method for correcting a color convergence error according to another embodiment of the present disclosure. As shown in FIG. 2b, the method includes:

step 201: controlling a projection system to project a first test pattern and a second test pattern, to collect respectively a first projection image and a second projection image on a projection screen;

step 202: acquiring respectively a first center-of-mass coordinate and a second center-of-mass coordinate corresponding to projection image points on the first projection image and the second projection image;

step 203: calculating respectively coordinate offsets of the projection image points corresponding to the three sets of R, G, and B test points relative to the projection image points corresponding to the three sets of monochrome test points according to the first center-of-mass coordinate and the second center-of-mass coordinate;

step 204: determining the color noises corresponding to the R, G, and B according to the coordinate offsets;

step 205: calculating center coordinates of three geometric figures by taking respectively the projection image points corresponding to the three sets of R, G, and B test points as vertices according to the second center-of-mass coordinate;

step 206: correcting center coordinates of three geometric figures by taking respectively the projection image points corresponding to the three sets of R, G, and B test points as vertices according to the color noises, to obtain the color coordinates of the projection image points corresponding to the three sets of R, G, and B test points;

step 207: calculating a superposition deviation of three colors of R, G, and B according to the color coordinates of the projection image points corresponding to the three colors of R, G, and B;

step 208: determining whether the superposition deviation is greater than a set deviation threshold; if yes, going to step 209; if no, ending the execution; and step 209: adjusting a position of a light source of the three colors of R, G, and B in the projection system, and going to step 201.

In step 201, optionally, each set of the three sets of monochromatic test points on the first test pattern may include three, four, or even N test points, where N is an integer. The specific value of N is not limited in this embodiment.

In order to take into account both the correction efficiency and the correction effect of the color convergence error, the inventor has repeatedly tested and found that when each set of test points includes four test points, a better correction efficiency and correction effect can be achieved. For convenience of description, the following content will take each set containing four test points as an example to illustrate the technical solution of the present disclosure, but it should be understood that in fact, the technical solution of the present disclosure does not limit each set to include four test points.

Optionally, it can be designed that any two test points in the three sets of monochromatic test points are not in the same row and not in the same column. The advantage of this design is that each row or each column contains only one test point, which is beneficial to quickly find the projection image points row by row or column by column from the first projection image or the second projection image and calculate the center-of-mass coordinate.

The positions of the three sets of R, G, and B test points on the second test pattern have a one-to-one correspondence with the positions of the three sets of monochromatic test points on the first test pattern. Therefore, the number and the arrangement feature of the test points on the second test pattern can be directly obtained according to the number and the arrangement feature of the test points on the first test pattern, which will not be repeated here.

Optionally, the test point may be a round point, a cross point, a square point or a point of other shapes, which is not limited in this embodiment. Optionally, the background color of the first test pattern and the second test pattern may be black to avoid the introduction of other colors of light from affecting the test points.

Figure 3A:
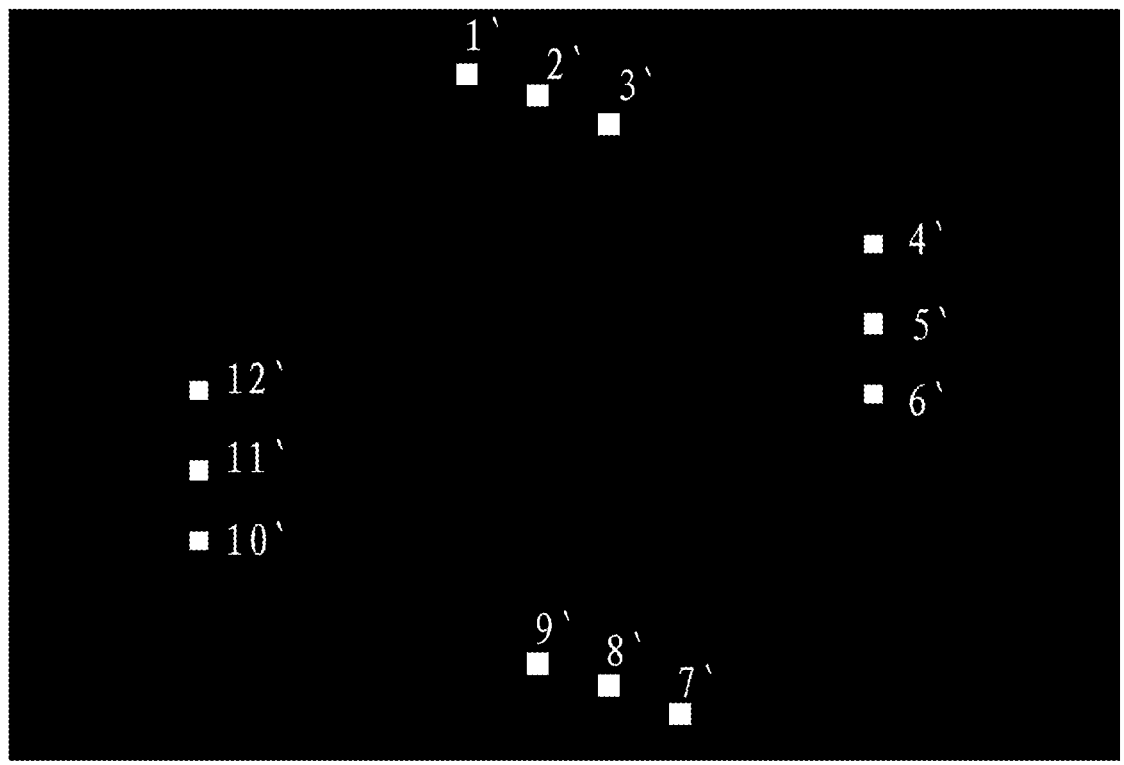
FIG. 3a is a schematic diagram of a first test pattern according to an embodiment of the present disclosure.

In an optional embodiment, when each set of test points includes four test points, the distribution of a total of 12 test points in three sets on the first test pattern may be as shown in FIG. 3a. The 12 test points are numbered in a clockwise sequence starting from the first test point in the upper left corner of the first test pattern. The first set of test points includes test points numbered 1', 4', 7' and 10', the second set of test points includes test points numbered 2', 5', 8' and 11', and the third set of test points includes test points numbered 3', 6', 9' and 12'. The center point of the rectangle by taking the test points numbered 1', 4', 7' and 10' as the vertices, the center point of the rectangle by taking the test points numbered 2', 5', 8' and 11' as the vertices, and the center point of the rectangle by taking the test points numbered 3', 6', 9' and 12' as the vertices superpose.

Figure 3B:
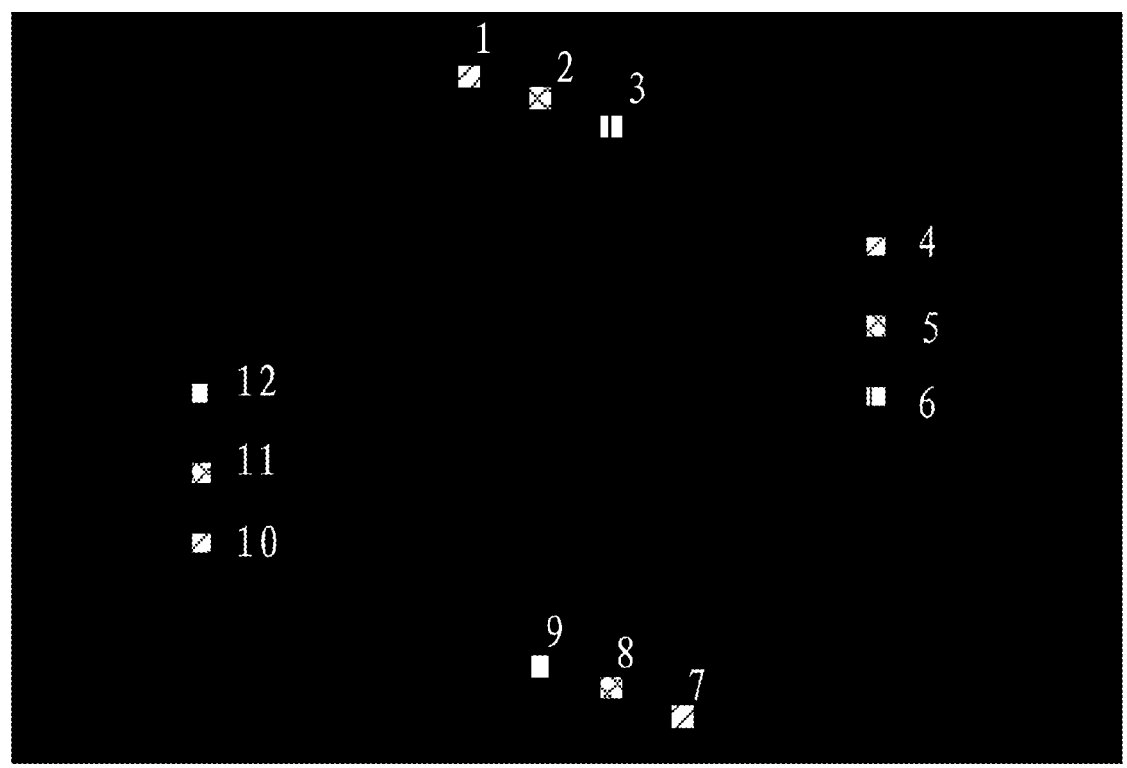
FIG. 3b is a schematic diagram of a second test pattern according to an embodiment of the present disclosure.

Correspondingly, the distribution of a total of 12 test points in the three sets of R, G, and B on the second test pattern may be shown in FIG. 3b. Similarly, the 12 test points are numbered in a clockwise sequence starting from the first test point in the upper left corner of the second test pattern. The R set of test points includes test points numbered 1, 4, 7, and 10, the G set of test points includes test points numbered 2, 5, 8 and 11, and the B set of test points includes test points numbered 3, 6, 9 and 12. In the same way, the center point of the first rectangle by taking the test points numbered 1, 4, 7 and 10 as the vertexes, the center point of the second rectangle by taking the test points numbered 2, 5, 8 and 11 as the vertexes, and the center point of the third rectangle by taking the test points numbered 3, 6, 9 and 12 as the vertexes superpose.

In step 202, the first projection image or the second projection image can be scanned row by row or column by column, and the center-of-mass coordinate corresponding to each scanned projection image point can be calculated, to obtain the first center-of-mass coordinate and the second center-of-mass coordinate.

In step 203, optionally, when the coordinate offsets of the projection image points corresponding to the three sets of R, G, and B test points relative to the projection image points corresponding to the three sets of monochrome test points are calculated, the set can be used as a unit. The calculation is as follows:

for the i-th set of test points in the three sets of R, G, and B test points, determining coordinates of the projection image points corresponding to the i-th set of test points according to the second center-of-mass coordinate, i=1, 2, or 3;

determining coordinates of the projection image points corresponding to the i'-th set of test points on having the same position as the i-th set of test points on the first test pattern according to the first center-of-mass coordinate, i'=i; and calculating coordinate differences between the projection image points corresponding to the i-th set of test points and the projection image points corresponding to the i'-th set of test points according to the coordinates of the projection image points corresponding to the i-th set of test points and the coordinates of the projection image points corresponding to the i'-th set of test points, and taking the coordinate differences as the coordinate offsets.

Taking FIG. 3a and FIG. 3b as an example, X0Y is use to mark the coordinate system where the first projection image and the second projection image are located. The R set of test points on the second test pattern are marked as the first set of test points, the G set of test points are marked as the second set of test points, and the B set of test points are marked as the third set of test points. When i=1, the first set of test points includes test points numbered 1, 4, 7 and 10. The coordinates of the projection image points corresponding to test points numbered 1, 4, 7 and 10 can be determined from the second center-of-mass coordinate, which are marked as P1 (X1, Y1), P4 (X4, Y4), P7 (X7, Y7) and P10 (X10, Y10). On the first test pattern, the 1'-th set of test points with the same position as the first set of test points includes test points numbered 1', 4', 7' and 10'. The coordinates of the projection image points corresponding to test points numbered 1', 4', 7' and 10' can be determined from the second center-of-mass coordinate, which are marked as P1' (X1',Y1'), P4' (X4',Y4'), P7' (X7', Y7') and P10' (X10',Y10'). Next, the coordinate difference $\Delta X11'$ and $\Delta Y11'$ between the projection image points P1', P4', P7' and P10' corresponding to the 1'-th set of test points and the projection image points P1, P4, P7 and P10 corresponding to the 1-th set of test points are calculated:

$$\Delta X1 = (X1+X4+X7+X10)/4 - (X1'+X4'+X7'+X10')/4$$

$$\Delta Y1 = (Y1+Y4+Y7+Y10)/4 - (Y1'+Y4'+Y7'+Y10')/4$$

Similarly, when i=2 and i=3, the coordinate difference $\Delta X2$ and $\Delta Y2$ between the projection image points corresponding to the 2'-th set of test points and the projection image points corresponding to the 1-th set of test points can be calculated, and the coordinate difference $\Delta X3$ and $\Delta Y3$ between the projection image points corresponding to the 3'-th set of test points and the projection image points corresponding to the 3-th set of test points can be calculated.

In step 204, after the coordinate offsets are determined, the coordinate offsets corresponding to the three colors of R, G, and B may be took respectively as the color noises corresponding to each color components. For example, following the above example, $\Delta X1$ and $\Delta Y1$ can be regarded as the color noises corresponding to R, $\Delta X2$ and $\Delta Y2$ can be regarded as the color noises corresponding to G, and $\Delta X3$ and $\Delta Y3$ can be regarded as the color noises corresponding to B.

In step 205, for the three sets of R, G, and B test points, the corresponding geometric shapes can be respectively outlined, and then the center point of the geometric shapes can be calculated.

Figure 3C:
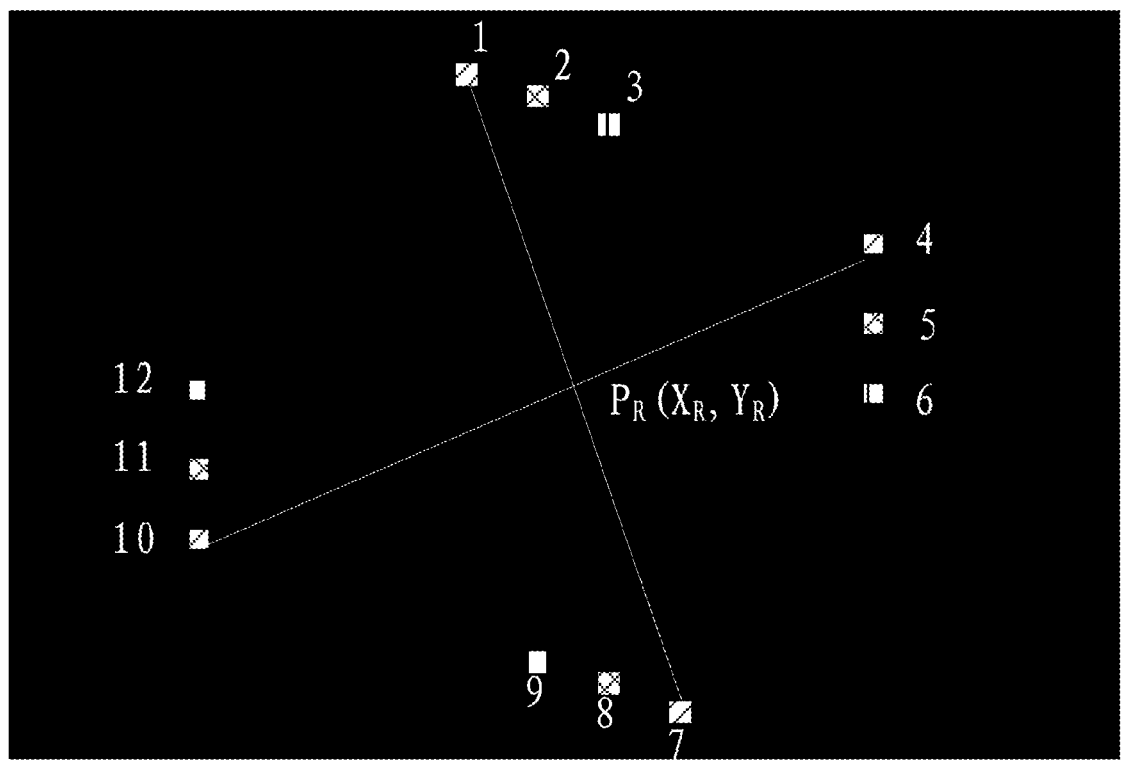
FIG. 3c is a schematic diagram of calculating a center of a geometric figure by taking a set of R test points as vertices according to an embodiment of the present disclosure.
Figure 3D:
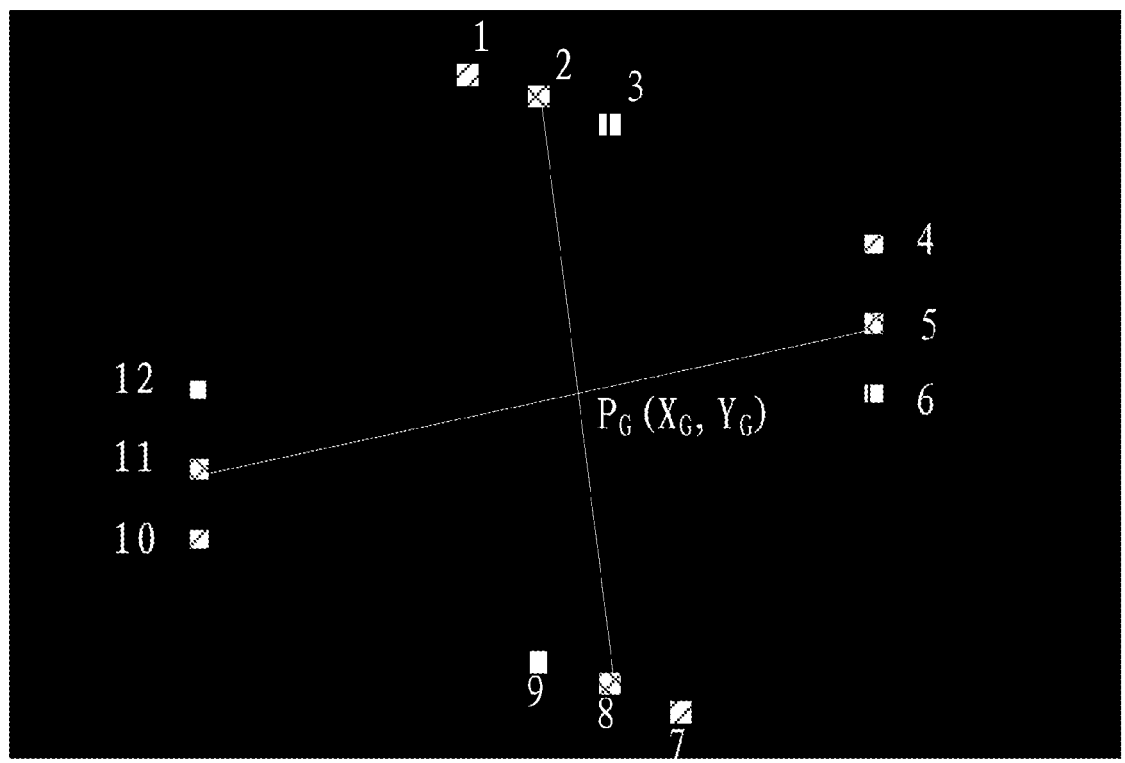
FIG. 3d is a schematic diagram of calculating a center of a geometric figure by taking a set of G test points as vertices according to an embodiment of the present disclosure.
Figure 3E:
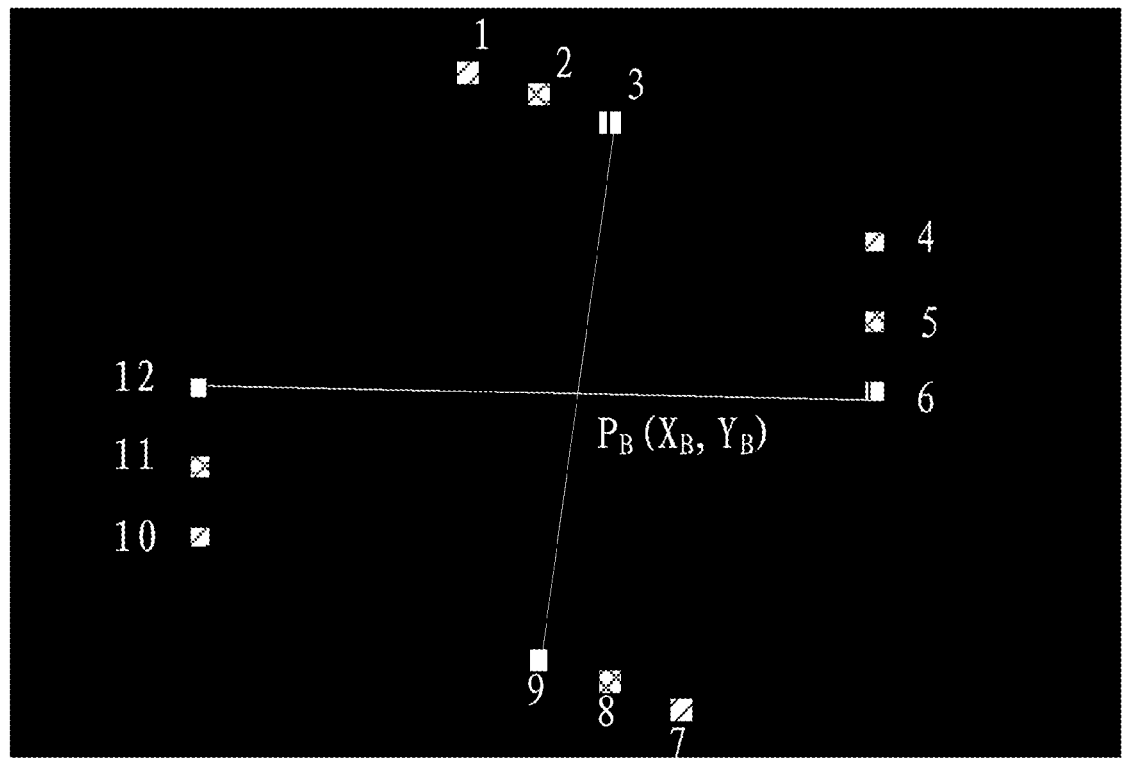
FIG. 3e is a schematic diagram of calculating a center of a geometric figure by taking a set of B test points as vertices according to an embodiment of the present disclosure.

Following the above example, when each set of test points includes four test points, the intersection of the diagonals of the rectangle formed by the projection image points corresponding to the four test points can be calculated as the center of the rectangle. For example, as shown in FIG. 3c, the intersection point $P_R$ ($X_R$, $Y_R$) of the straight line formed by the projection image points corresponding to the test points numbered 1 and 7 and the straight line formed by the projection image points corresponding to the test points numbered 4 and 10 can be calculated as the center of the first rectangle. As shown in FIG. 3d, the intersection PG ($X_G$, $Y_G$) of the straight line formed by the projection image points corresponding to the test points numbered 2 and 3 and the straight line formed by the projection image points corresponding to the test points numbered 5 and 11 can be calculated as the center of the second rectangle. As shown in FIG. 3e, the intersection point $P_B$ ($X_B$, $Y_B$) of the straight line formed by the projection image points corresponding to the test points numbered 3 and 9 and the straight line formed by the projection image points corresponding to the test points numbered 6 and 12 can be calculated as the center of the third rectangle.

In step 206, optionally, when the center coordinates are corrected based on the color noises, the corresponding color noise may be subtracted on the basis of the center coordinates. For example, following the above example, the color coordinate of the projection image point corresponding to the R set of test points can be ($X_R - \Delta X1$, $Y_R - \Delta Y1$), and the color coordinate of the projection image point corresponding to the R set of test points can be ($X_G - \Delta X2$, $Y_G - \Delta Y2$), the color coordinate of the projection image point corresponding to the R set of test points can be ($X_B - \Delta X3$, $Y_B - \Delta Y3$).

In steps 207-209, after the color coordinates of the projection image points corresponding to the three sets of R, G, and B test points are determined, the superposition deviation of the three colors of R, G, and B can be calculated based on the three color coordinates. Besides, when the superposition deviation is greater than the set deviation threshold, the position of the three-color light source in the projection system can be adjusted. After the adjustment, step 201 can be executed again to continue to detect whether there is still a color convergence error. Optionally, the deviation threshold is an empirical value related to actual demand, which is not limited in this embodiment.

In this embodiment, the projection system is controlled to project the first test pattern and the second test pattern, and whether the three different color light points projected by the projection system being superposed are analyzed by comparing the projection results corresponding to the first test pattern and the second test pattern whether the points coincide to determine whether there is a color convergence error in the projection system. In such a technical solution, the color convergence error of the projection system may be effectively detected and corrected, which is beneficial to improve the imaging quality of the projection system.

It should be understood that although the terms first, second, third, etc. may be used to describe XXX in the embodiments of the present disclosure, these XXX should not be limited only to those terms. These terms are only used to distinguish the XXX from each other. For example, a first XXX may also be referred to as a second XXX without departing from the scope of the embodiments of the present disclosure. Similarly, a second XXX may also be referred to as a first XXX.

It is also to be noted that terms "include", "contain" or any other variants thereof are intended to include nonexclusive inclusions, thereby ensuring that a commodity or system including a series of elements not only includes those elements but also includes other elements which are not clearly listed or further includes elements intrinsic to the commodity or the system. Under the condition of no more restrictions, an element defined by statement "including a/an" does not exclude existence of another element which is the same in a commodity or system including the element.

Figure 4:
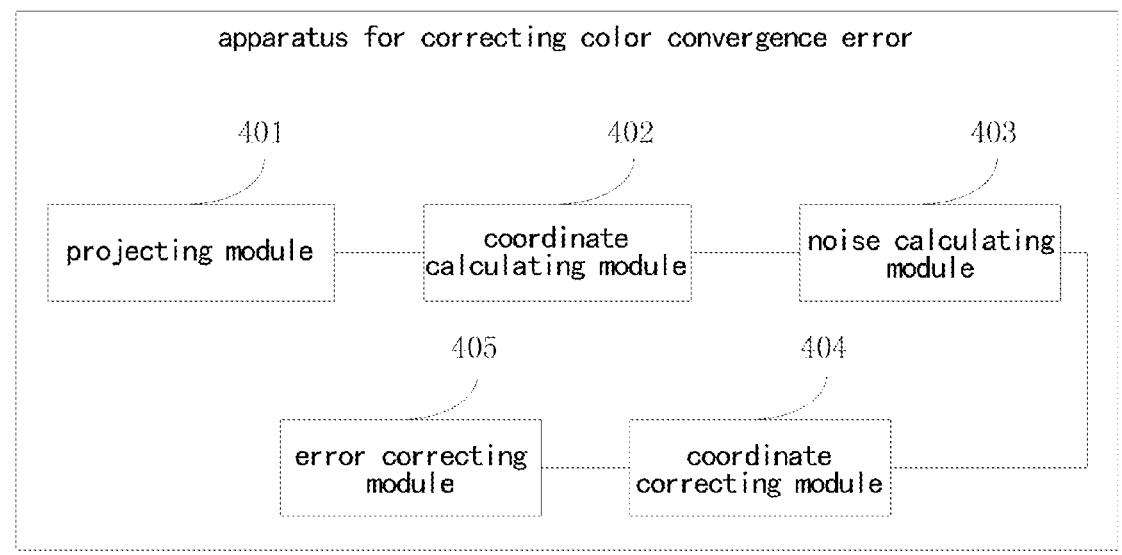
FIG. 4 is a schematic structural diagram of an apparatus for correcting a color convergence error according to an embodiment of the present disclosure.

The above describes alternative implementations of the method for correcting the color convergence error. As shown in FIG. 4, in practice, the method for correcting the color convergence error can be implemented by an apparatus for correcting the color convergence error, as shown in FIG. 4, the apparatus includes:

a projecting module 401, configured to control a projection system to project a first test pattern containing three sets of monochromatic test points and a second test pattern containing three sets of R, G, and B test points, to collect respectively a first projection image and a second projection image on the projection screen; where centers of three geometric figures by taking respectively the three sets of monochromatic test points as vertices superpose, and positions of the three sets of R, G, and B test points have a one-to-one correspondence with positions of the three sets of monochromatic test points;

a coordinate calculating module 402, configured to acquire respectively a first center-of-mass coordinate and a second center-of-mass coordinate corresponding to projection image points on the first projection image and the second projection image;

a noise calculating module 403, configured to calculate respectively color noises corresponding to R, G, and B according to the first center-of-mass coordinate and the second center-of-mass coordinate;

a coordinate correcting module 404, configured to calculate color coordinates corresponding to the R, G, and B according to the color noises corresponding to the R, G, and B and the second center-of-mass coordinate; and an error correcting module 405, configured to adjust an assembly parameter of the projection system according to the color coordinates corresponding to the R, G, and B.

Further optionally, the noise calculating module 403 is specifically configured to: calculate respectively coordinate offsets of the projection image points corresponding to the three sets of R, G, and B test points relative to the projection image points corresponding to the three sets of monochrome test points according to the first center-of-mass coordinate and the second center-of-mass coordinate; and determine the color noises corresponding to the R, G, and B according to the coordinate offsets.

Further optionally, the noise calculating module 403 is specifically configured to: for the i-th set of test points in the three sets of R, G, and B test points, determine coordinates of the projection image points corresponding to the i-th set of test points according to the second center-of-mass coordinate, i=1, 2, or 3; determine coordinates of the projection image points corresponding to the i'-th set of test points on having the same position as the i-th set of test points on the first test pattern according to the first center-of-mass coordinate, i'=i; and calculate coordinate differences between the projection image points corresponding to the i-th set of test points and the projection image points corresponding to the i'-th set of test points according to the coordinates of the projection image points corresponding to the i-th set of test points and the coordinates of the projection image points corresponding to the i'-th set of test points, and take the coordinate differences as the coordinate offsets.

Further optionally, the coordinate correcting module 404 is specifically configured to: calculate center coordinates of three geometric figures by taking respectively the projection image points corresponding to the three sets of R, G, and B test points as vertices according to the second center-of-mass coordinate; and correct center coordinates of three geometric figures by taking respectively the projection image points corresponding to the three sets of R, G, and B test points as vertices according to the color noises, to obtain the color coordinates of the projection image points corresponding to the three sets of R, G, and B test points.

Further optionally, the error correcting module 405 is specifically configured to: calculate a superposition deviation of three colors of R, G, and B according to the color coordinates of the projection image points corresponding to the three colors of R, G, and B; if the superposition deviation is greater than a set deviation threshold, adjust a position of a light source of the three colors of R, G, and B in the projection system, to reduce the superposition deviation.

Further optionally, any two test points in the three sets of monochromatic test points are not in the same row and not in the same column.

Further optionally, each of the three sets of monochromatic test points comprises four test points.

The aforementioned apparatus for correcting the color convergence error can execute the method for correcting the color convergence error according to the embodiment of the present disclosure, and has the corresponding functional modules and beneficial effects for the execution method. Technical details that are not described in detail in the present embodiment can refer to the method provided in the embodiment of the present disclosure, and will not be repeated.

Figure 5:
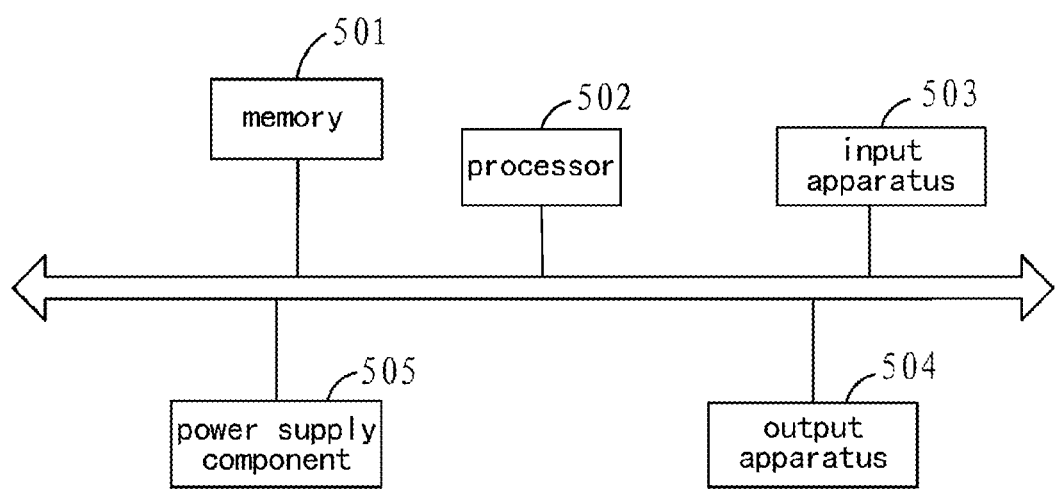
FIG. 5 is a schematic structural diagram of an electronic device according to an embodiment of the present disclosure.

The internal structure and function of the apparatus for correcting the color convergence error are described above. In practice, the apparatus for correcting the color convergence error can be represented as an electronic device. As shown in FIG. 5, the electronic device includes a memory 501, a processor 502, an input apparatus 503, and an output apparatus 504.

The memory 501, the processor 502, the input apparatus 503, and the output apparatus 504 may be connected by a bus or other means. The bus connection is taken as an example in FIG. 5.

The memory 501 is used to store one or more computer instructions, and can be configured to store various other data to support operations on the electronic device. Examples of such data include instructions of any application or method operated on the electronic device.

The memory 501 can be implemented by any type of volatile or non-volatile storage device or a combination of them, such as static random access memory (SRAM for short), electrically erasable programmable read-only memory (EEPROM for short), erasable Programmable Read Only Memory (EPROM for short), Programmable Read Only Memory (PROM for short), Read Only Memory (ROM for short), Magnetic Memory, Flash Memory, Magnetic Disk or Optical Disk.

In some embodiments, the memory 501 may optionally include a memory remotely set with respect to the processor 502, and the remote memory may be connected to the electronic device. Examples of the aforementioned network include but are not limited to the Internet, corporate intranet, local area network, mobile communication network, and combinations thereof.

The processor 502 is coupled with the memory 501, and is configured to execute the one or more computer instructions for executing the method provided in the embodiment corresponding to FIG. 1 to FIG. 2.

The input apparatus 503 can receive inputted number or character information, and generate key signal input related to user setting and function control of the electronic device. The output apparatus 504 may include a display device such as a display screen.

Further, as shown in FIG. 5, the device further includes: a power supply component 505. The power supply component 505 provides power for various components of the device where the power supply component is located. The power supply component may include a power management system, one or more power supplies, and other components associated with generating, managing, and distributing power for the device where the power supply component is located.

The aforementioned electronic device can execute the method for correcting the color convergence error provided by the embodiments of the present application, and has the corresponding functional modules and beneficial effects for the execution method. Technical details that are not described in detail in the present embodiment can refer to the method provided in the embodiment of the present disclosure, and will not be repeated.

The apparatus embodiments described above are merely illustrative, where the units described as separate components may or may not be physically separated, and the components displayed as units may or may not be physical units, i.e., may be located at a place, or may be distributed to multiple network units. Some or all of the modules may be selected according to actual needs to achieve the purpose of the scheme of this embodiment. Those of ordinary skill in the art can understand and implement without creative work.

Through the description of the above implementation modes, those skilled in the art can clearly understand that various implementation modes may be implemented by means of software and a necessary general hardware platform, and of course, by hardware. Based on such understanding, the essence of the foregoing technical solutions or portions making contribution to the prior art may be embodied in the form of software products. The computer software products may be stored in a computer-readable storage medium such as a ROM/RAM, a magnetic disk and an optical disc, including instructions for causing a computer device (which may be a personal computer, a server, or a network device, etc.) to perform the methods described in various embodiments or portions of the embodiments.

It is finally to be noted that the above embodiments are adopted not to limit but only to describe the technical solutions of the present disclosure. Although the present disclosure has been described with reference to the above-mentioned embodiments in detail, those of ordinary skill in the art should know that modifications may still be made to the technical solutions recorded in each embodiment or equivalent replacements may be made to part of technical features therein. These modifications or replacements do not make the essences of the corresponding technical solutions depart from the spirit and scope of the technical solutions of each embodiment of the present disclosure.

What is claimed is:

1. A method for correcting a color convergence error, comprising:
    controlling a projection system to project a first test pattern containing three sets of monochromatic test points and a second test pattern containing three sets of R, G, and B test points, to collect respectively a first projection image and a second projection image on the projection screen;
    wherein centers of three geometric figures by taking respectively the three sets of monochromatic test points as vertices superpose, and positions of the three sets of R, G, and B test points have a one-to-one correspondence with positions of the three sets of monochromatic test points;
    acquiring respectively a first center-of-mass coordinate and a second center-of-mass coordinate corresponding to projection image points on the first projection image and the second projection image;
    calculating respectively color noises corresponding to R, G, and B according to the first center-of-mass coordinate and the second center-of-mass coordinate;
    calculating color coordinates corresponding to the R, G, and B according to the color noises corresponding to the R, G, and B and the second center-of-mass coordinate; and
    adjusting an assembly parameter of the projection system according to the color coordinates corresponding to the R, G, and B.

2. The method according to claim 1, wherein the calculating respectively the color noises corresponding to the R, G, and B according to the first center-of-mass coordinate and the second center-of-mass coordinate comprises:
    calculating respectively coordinate offsets of the projection image points corresponding to the three sets of R, G, and B test points relative to the projection image points corresponding to the three sets of monochrome test points according to the first center-of-mass coordinate and the second center-of-mass coordinate; and
    determining the color noises corresponding to the R, G, and B according to the coordinate offsets.

3. The method according to claim 2, wherein the calculating respectively the coordinate offsets of the projection image points corresponding to the three sets of R, G, and B test points relative to the projection image points corresponding to the three sets of monochrome test points according to the first center-of-mass coordinate and the second center-of-mass coordinate comprises:
    for the i-th set of test points in the three sets of R, G, and B test points, determining coordinates of the projection image points corresponding to the i-th set of test points according to the second center-of-mass coordinate, i=1, 2, or 3;
    determining coordinates of the projection image points corresponding to the i'-th set of test points on having the same position as the i-th set of test points on the first test pattern according to the first center-of-mass coordinate, i'=i; and
    calculating coordinate differences between the projection image points corresponding to the i-th set of test points and the projection image points corresponding to the i'-th set of test points according to the coordinates of the projection image points corresponding to the i-th set of test points and the coordinates of the projection image points corresponding to the i'-th set of test points, and taking the coordinate differences as the coordinate offsets.

4. The method according to claim 3, wherein the adjusting the assembly parameter of the projection system according to the color coordinates corresponding to the R, G, and B comprises:
    calculating a superposition deviation of three colors of R, G, and B according to the color coordinates of the projection image points corresponding to the three colors of R, G, and B;
    if the superposition deviation is greater than a set deviation threshold, adjusting a position of a light source of the three colors of R, G, and B in the projection system, to reduce the superposition deviation.

5. The method according to claim 3, wherein any two test points in the three sets of monochromatic test points are not in the same row and not in the same column.

6. The method according to claim 3, wherein each of the three sets of monochromatic test points comprises four test points.

7. The method according to claim 2, wherein the adjusting the assembly parameter of the projection system according to the color coordinates corresponding to the R, G, and B comprises:
    calculating a superposition deviation of three colors of R, G, and B according to the color coordinates of the projection image points corresponding to the three colors of R, G, and B;
    if the superposition deviation is greater than a set deviation threshold, adjusting a position of a light source of the three colors of R, G, and B in the projection system, to reduce the superposition deviation.

8. The method according to claim 2, wherein any two test points in the three sets of monochromatic test points are not in the same row and not in the same column.

9. The method according to claim 2, wherein each of the three sets of monochromatic test points comprises four test points.

10. The method according to claim 1, wherein the calculating the color coordinates corresponding to the R, G, and B according to the color noises corresponding to the R, G, and B and the second center-of-mass coordinate comprises:
calculating center coordinates of three geometric figures by taking respectively the projection image points corresponding to the three sets of R, G, and B test points as vertices according to the second center-of-mass coordinate; and
correcting center coordinates of three geometric figures by taking respectively the projection image points corresponding to the three sets of R, G, and B test points as vertices according to the color noises, to obtain the color coordinates of the projection image points corresponding to the three sets of R, G, and B test points.

11. The method according to claim 10, wherein the adjusting the assembly parameter of the projection system according to the color coordinates corresponding to the R, G, and B comprises:
calculating a superposition deviation of three colors of R, G, and B according to the color coordinates of the projection image points corresponding to the three colors of R, G, and B;
if the superposition deviation is greater than a set deviation threshold, adjusting a position of a light source of the three colors of R, G, and B in the projection system, to reduce the superposition deviation.

12. The method according to claim 10, wherein any two test points in the three sets of monochromatic test points are not in the same row and not in the same column.

13. The method according to claim 10, wherein each of the three sets of monochromatic test points comprises four test points.

14. The method according to claim 1, wherein the adjusting the assembly parameter of the projection system according to the color coordinates corresponding to the R, G, and B comprises:
calculating a superposition deviation of three colors of R, G, and B according to the color coordinates of the projection image points corresponding to the three colors of R, G, and B;
if the superposition deviation is greater than a set deviation threshold, adjusting a position of a light source of the three colors of R, G, and B in the projection system, to reduce the superposition deviation.

15. The method according to claim 1, wherein any two test points in the three sets of monochromatic test points are not in the same row and not in the same column.

16. The method according to claim 1, wherein each of the three sets of monochromatic test points comprises four test points.

17. An apparatus for correcting a color convergence error, comprising:
a projecting module, configured to control a projection system to project a first test pattern containing three sets of monochromatic test points and a second test pattern containing three sets of R, G, and B test points, to collect respectively a first projection image and a second projection image on the projection screen;
wherein centers of three geometric figures by taking respectively the three sets of monochromatic test points as vertices superpose, and positions of the three sets of R, G, and B test points have a one-to-one correspondence with positions of the three sets of monochromatic test points;
a coordinate calculating module, configured to acquire respectively a first center-of-mass coordinate and a second center-of-mass coordinate corresponding to projection image points on the first projection image and the second projection image;
a noise calculating module, configured to calculate respectively color noises corresponding to R, G, and B according to the first center-of-mass coordinate and the second center-of-mass coordinate;
a coordinate correcting module, configured to calculate color coordinates corresponding to the R, G, and B according to the color noises corresponding to the R, G, and B and the second center-of-mass coordinate; and
an error correcting module, configured to adjust an assembly parameter of the projection system according to the color coordinates corresponding to the R, G, and B.

18. The apparatus according to claim 17, wherein the noise calculating module is specifically configured to:
calculate respectively coordinate offsets of the projection image points corresponding to the three sets of R, G, and B test points relative to the projection image points corresponding to the three sets of monochrome test points according to the first center-of-mass coordinate and the second center-of-mass coordinate; and
determine the color noises corresponding to the R, G, and B according to the coordinate offsets.

19. An electronic device, comprising: a memory and a processor;
wherein the memory is used to store at least one computer instruction;
the processor is used to execute the method according to claim 1.

* * * * *